(12) United States Patent
Mouri et al.

(10) Patent No.: US 10,486,584 B2
(45) Date of Patent: Nov. 26, 2019

(54) HEADLAMP DEVICE FOR VEHICLE

(71) Applicants: Fumihiko Mouri, Owariasahi (JP);
Susumu Yamamoto, Toyota (JP);
Satoshi Yamamura, Shizuoka (JP)

(72) Inventors: Fumihiko Mouri, Owariasahi (JP);
Susumu Yamamoto, Toyota (JP);
Satoshi Yamamura, Shizuoka (JP)

(73) Assignees: TOYOTA JIDOSHA KABUSHIKI KAISHA, Toyota-shi (JP); KOITO MANUFACTURING CO., LTD., Minato-ku (JP)

( * ) Notice: Subject to any disclaimer, the term of this patent is extended or adjusted under 35 U.S.C. 154(b) by 135 days.

(21) Appl. No.: 15/895,011

(22) Filed: Feb. 13, 2018

(65) Prior Publication Data

US 2018/0264990 A1  Sep. 20, 2018

(30) Foreign Application Priority Data

Mar. 17, 2017  (JP) .................................. 2017-053406

(51) Int. Cl.
*B60Q 1/00* (2006.01)
*B60Q 1/08* (2006.01)
(Continued)

(52) U.S. Cl.
CPC .......... *B60Q 1/0023* (2013.01); *B60Q 1/0011* (2013.01); *B60Q 1/085* (2013.01); *F21S 41/13* (2018.01); *F21S 41/147* (2018.01); *F21S 41/25* (2018.01); *F21S 41/285* (2018.01); *F21S 41/36* (2018.01); *F21S 41/365* (2018.01); *F21S 41/663* (2018.01); *F21S 41/675* (2018.01); *F21S 45/47* (2018.01); *B60Q 2300/05* (2013.01)

(58) Field of Classification Search
CPC ........ F21S 41/285; F21S 41/675; F21S 41/36; F21S 41/47; B60Q 1/0023; B60Q 1/0011; B60Q 1/085
See application file for complete search history.

(56) References Cited

U.S. PATENT DOCUMENTS 9,245,333 B1   1/2016  Beck et al.
2001/0050340 A1  12/2001  Holz et al.
(Continued)

FOREIGN PATENT DOCUMENTS

DE   100 02 069 A1   8/2001
EP   2 551 155 A2   1/2013
(Continued)

*Primary Examiner* — Karabi Guharay
(74) *Attorney, Agent, or Firm* — Oblon, McClelland, Maier & Neustadt, L.L.P.

(57) ABSTRACT

There is provided a headlamp device for a vehicle, including: a visible light source that irradiates visible light to provide a field of view at a vehicle front side; a detection light source that irradiates detection light that detects obstacles; a MEMS mirror changeable between a first angle and a second angle that is different from the first angle, the MEMS mirror at the first angle reflecting visible light, irradiated from the visible light source, toward the vehicle front side, and the MEMS mirror at the second angle reflecting detection light, irradiated from the detection light source, toward the vehicle front side; and a light receiving element that receives reflected light that has reached and been reflected by an obstacle.

10 Claims, 6 Drawing Sheets

(51) Int. Cl.
*F21S 41/20* (2018.01)
*F21S 45/47* (2018.01)
*F21S 41/675* (2018.01)
*F21S 41/36* (2018.01)
*F21S 41/13* (2018.01)
*F21S 41/147* (2018.01)
*F21S 41/25* (2018.01)
*F21S 41/663* (2018.01)
*F21S 41/365* (2018.01)

(56) References Cited

U.S. PATENT DOCUMENTS

| | | |
|---|---|---|
| 2009/0015388 A1 | 1/2009 | Yagi et al. |
| 2012/0250137 A1 | 10/2012 | Maxik et al. |
| 2013/0271818 A1 | 10/2013 | Maxik et al. |
| 2014/0211295 A1 | 7/2014 | Maxik et al. |
| 2016/0238209 A1 | 8/2016 | Kimura |
| 2016/0377252 A1 | 12/2016 | Bhakta |
| 2017/0136939 A1* | 5/2017 | Mouri .................... F21S 41/17 |
| 2017/0160542 A1* | 6/2017 | Mouri ................... F21S 41/147 |
| 2017/0334337 A1* | 11/2017 | Ohno ..................... F21S 41/16 |

FOREIGN PATENT DOCUMENTS

| | | |
|---|---|---|
| EP | 3 048 361 A1 | 7/2016 |
| JP | 2005-067294 | 3/2005 |
| JP | 2013-023182 | 2/2013 |
| WO | 2015/033764 A1 | 3/2015 |

* cited by examiner

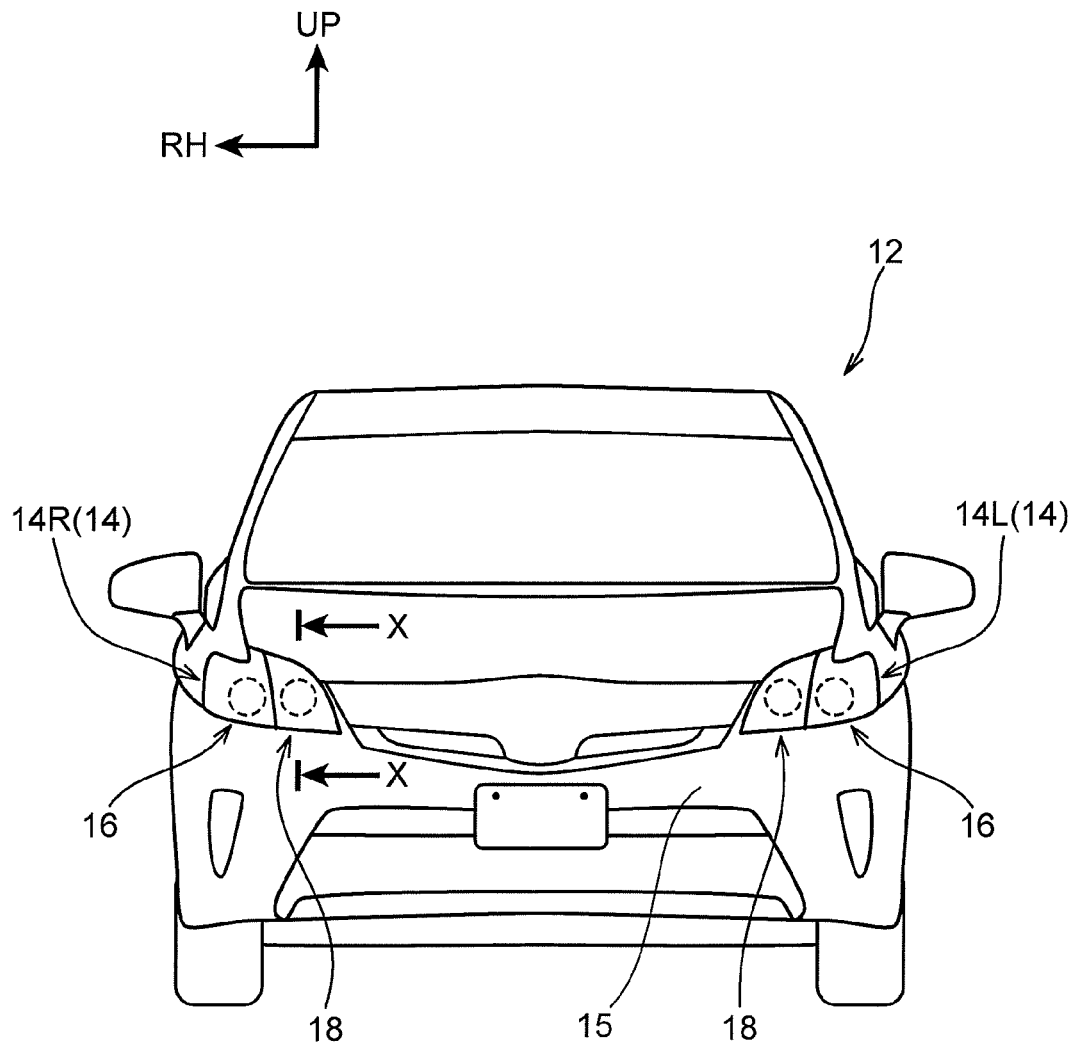

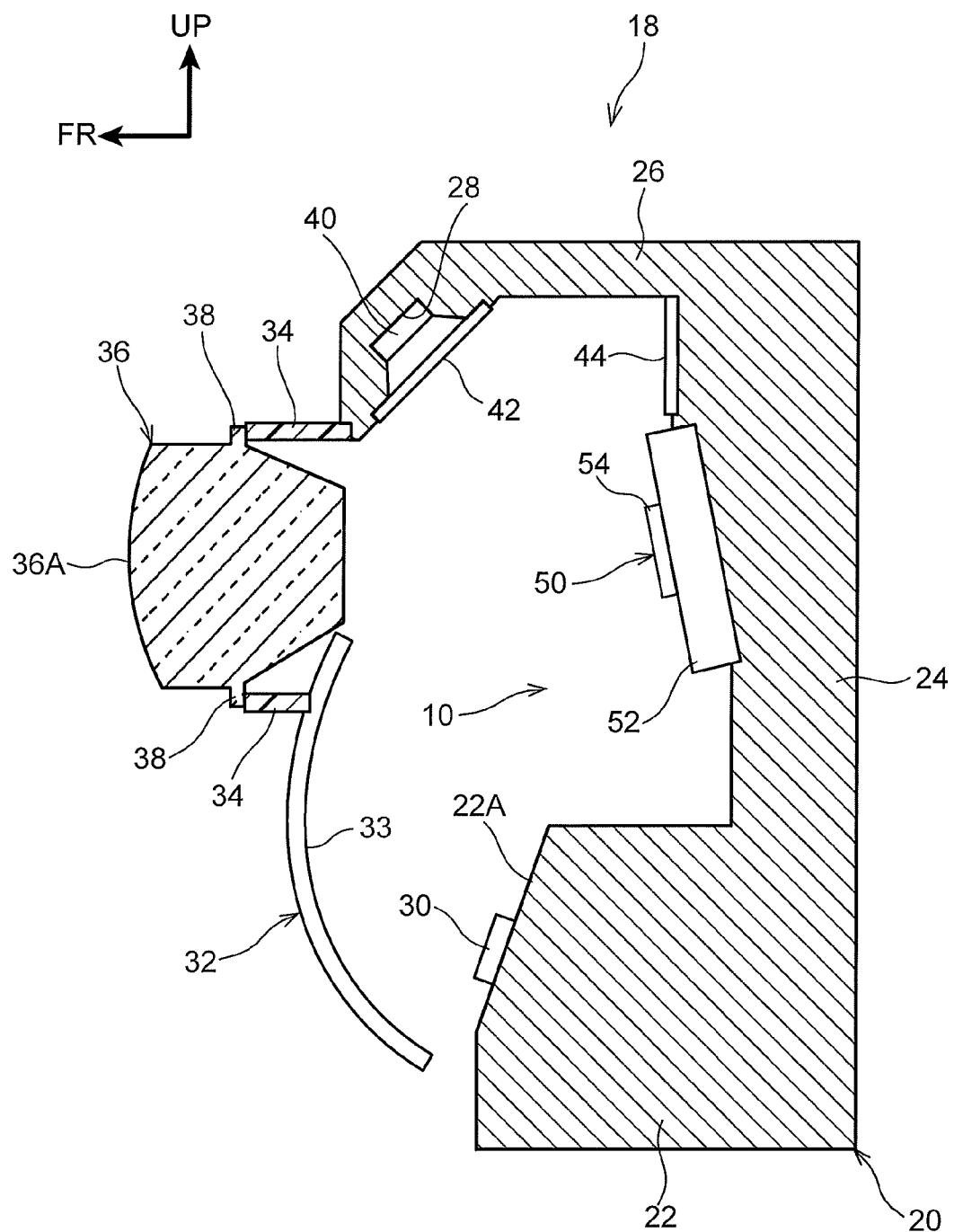

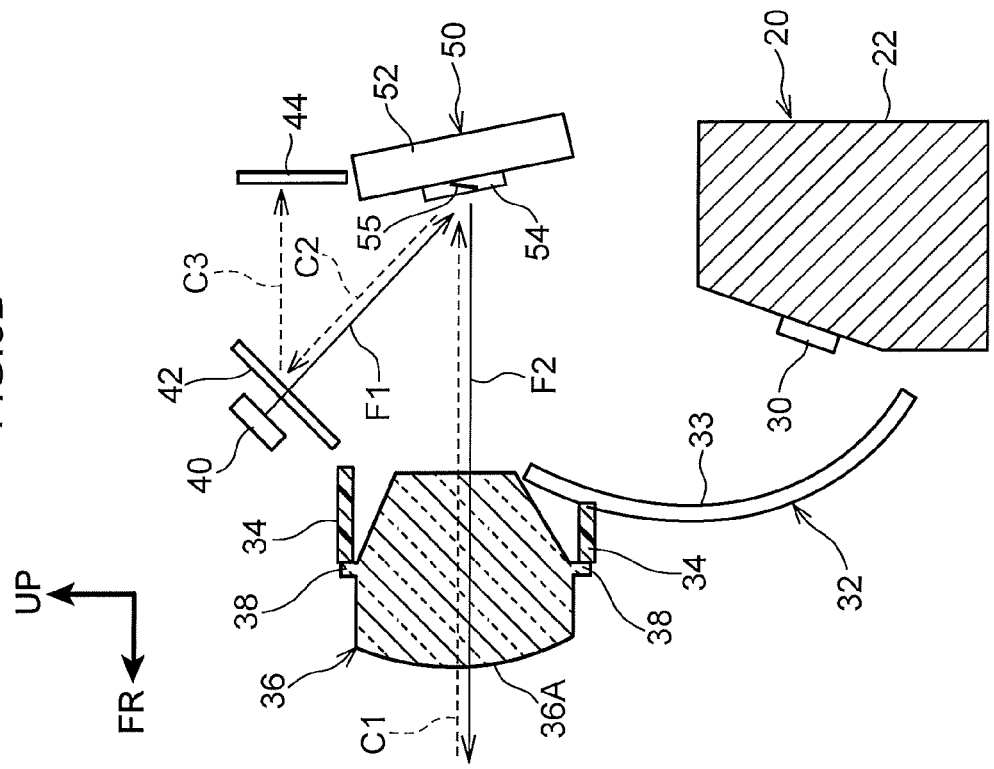
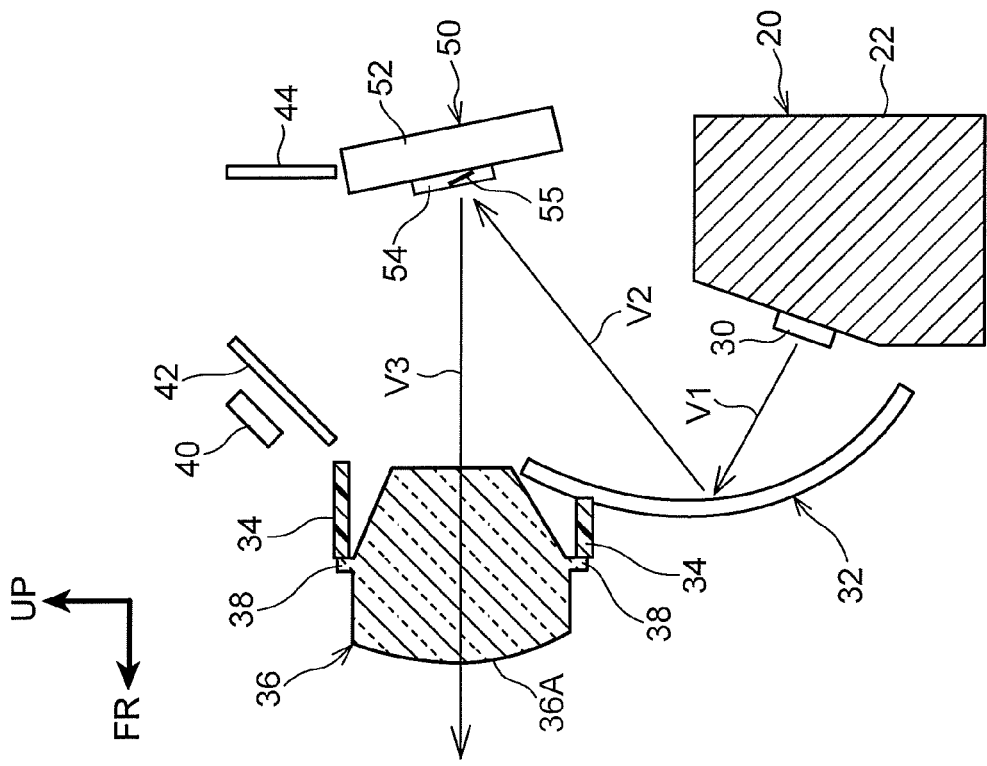

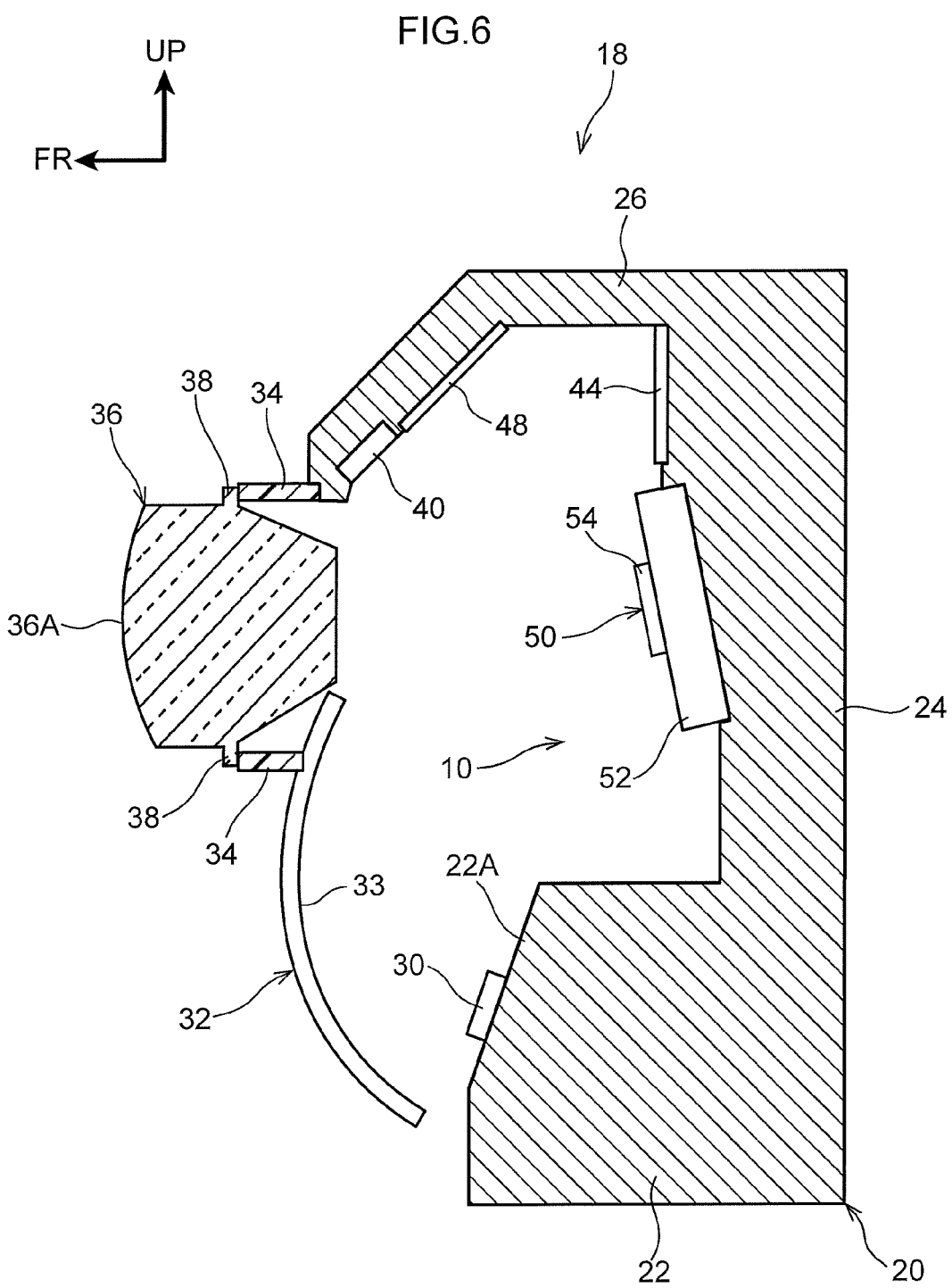

HEADLAMP DEVICE FOR VEHICLE

CROSS-REFERENCE TO RELATED APPLICATION

This application is based on and claims priority under 35 USC 119 from Japanese Patent Application No. 2017-053406 filed on Mar. 17, 2017, the disclosure of which is incorporated by reference herein.

BACKGROUND

Technical Field

The present disclosure relates to a headlamp device for a vehicle.

Related Art

A headlamp control system has been known since heretofore (for example, see Japanese Patent Application Laid-Open (JP-A) No. 2005-67294) that includes: an obstacle detector that detects an obstacle to the front; a vehicle speed sensor that senses vehicle speed; a lamp whose optical axis direction can be altered; and a control unit that controls alterations of the optical axis direction of the lamp in accordance with obstacles detected by the obstacle detector and vehicle speeds detected by the vehicle speed sensor.

If a headlamp unit including a lamp is equipped with an obstacle detector such as a radar or the like side by side with the lamp, an increase in size of the headlamp unit in the vehicle width direction may result. In this case, the obstacle detector such as a radar or the like may be exposed to the exterior through an external shell that is a design surface of the vehicle.

As a result, the external appearance of the vehicle may be impaired.

SUMMARY

Accordingly, the present disclosure provides a headlamp device for a vehicle that may suppress an increase in size of a headlamp unit in the vehicle width direction and that may suppress impairment of the external appearance of the vehicle.

A headlamp device for a vehicle according to a first aspect of the present disclosure includes: a visible light source that irradiates visible light to provide a field of view at a vehicle front side; a detection light source that irradiates detection light that detects obstacles; a MEMS mirror changeable between a first angle and a second angle that is different from the first angle, the MEMS mirror at the first angle reflecting visible light irradiated from the visible light source toward the vehicle front side, and the MEMS mirror at the second angle reflecting detection light irradiated from the detection light source toward the vehicle front side; and a light receiving element that receives reflected light that has reached and been reflected by an obstacle.

According to the first aspect of the present disclosure, the MEMS mirror disposed at the first angle reflects and irradiates the visible light for assuring the field of view at the front side of the vehicle toward the vehicle front side, and the MEMS mirror disposed at the second angle that is different from the first angle reflects and irradiates the detection light for detecting an obstacle toward the vehicle front side. Consequently, compared to a structure in which a visible light source and a detection light source are provided side by side in a headlamp unit and irradiate visible light and detection light directly, an increase in size of the headlamp unit in the vehicle width direction is suppressed and impairment of the external appearance of the vehicle is suppressed.

In a headlamp device for a vehicle according to a second aspect of the present disclosure, in the headlamp device for a vehicle according to the first aspect, in a front view seen in a vehicle front-rear direction, the visible light source and the detection light source are arranged above and below the MEMS mirror to sandwich the MEMS mirror.

If, for example, the visible light source and the detection light source are both disposed at the upper side or the lower side of the MEMS mirror, there is hardly any difference between the first angle and the second angle. Hence, if a driver mistakenly turns on the visible light source while the detection light source is turned on and the detection light is being irradiated by control from a control unit, then at least some of the visible light is directly reflected by the MEMS mirror, the visible light leaks to the front side of the vehicle, and there may be a problem such as dazzling of an oncoming vehicle or a preceding vehicle.

However, according to the second aspect of the present disclosure, because the visible light source and the detection light source are disposed above and below the MEMS mirror, sandwiching the MEMS mirror, the difference between the first angle and the second angle may be made relatively large. Therefore, if a driver mistakenly turns on the visible light source while the detection light source is turned on and the detection light is being irradiated by control from the control unit, the visible light is not directly reflected by the MEMS mirror and none of the visible light leaks to the front side of the vehicle. As a result, a problem such as dazzling of an oncoming vehicle or preceding vehicle is suppressed.

In a headlamp device for a vehicle according to a third aspect of the present disclosure, the headlamp device for a vehicle according to the first aspect or the second aspect further includes a concave reflection mirror that reflects visible light irradiated by the visible light source onto the MEMS mirror.

According to the third aspect of the present disclosure, the visible light irradiated from the visible light source is reflected by the concave reflection mirror and reflected by the MEMS mirror. Therefore, the visible light irradiated at the MEMS mirror is condensed more efficiently than in a structure in which the concave reflection mirror is not provided.

In a headlamp device for a vehicle according to a fourth aspect of the present disclosure, the headlamp device for a vehicle according to any one of the first to third aspects further includes a turnback reflection mirror that reflects reflected light that has been irradiated onto and reflected by the MEMS mirror, the turnback reflection mirror reflecting the reflected light onto the light receiving element.

According to the fourth aspect of the present disclosure, after reflected light is irradiated at and reflected by the MEMS mirror, the reflected light is further reflected by the turnback reflection mirror and irradiated onto the light receiving element. Therefore, compared to a structure in which a turnback reflection mirror is not provided, space for arranging the light receiving element is excellently assured.

In a headlamp device for a vehicle according to a fifth aspect of the present disclosure, in the headlamp device for a vehicle according to the fourth aspect, a condensing lens is disposed between the turnback reflection mirror and the light receiving element, the condensing lens condensing the reflected light that is reflected onto the light receiving element.

According to the fifth aspect of the present disclosure, the condensing lens that condenses the reflected light irradiated at the light receiving element is disposed between the turnback reflection mirror and the light receiving element. Therefore, compared to a structure in which the condensing lens is not provided, the reflection light irradiated at the light receiving element is efficiently condensed.

In a headlamp device for a vehicle according to a sixth aspect of the present disclosure, in the headlamp device for a vehicle according to any one of the first to fifth aspects, the visible light source, the detection light source and the MEMS mirror are retained by a single heat sink.

According to the sixth aspect of the present disclosure, the visible light source, the detection light source and the MEMS mirror are retained by the single heat sink. Therefore, respective positioning of the visible light source, the detection light source and the MEMS mirror is easier than in a structure in which the visible light source, the detection light source and the MEMS mirror are retained by respectively separate heat sinks.

In a headlamp device for a vehicle according to a seventh aspect of the present disclosure, in the headlamp device for a vehicle according to any one of the first to sixth aspects: at a time at which visible light is irradiated from the visible light source, the MEMS mirror is not electrified and is disposed at the first angle; and at a time at which detection light is irradiated from the detection light source, the MEMS mirror is electrified and is disposed at the second angle.

According to the seventh aspect of the present disclosure, when the visible light is to be irradiated from the visible light source, the MEMS mirror is not electrified and is disposed at the first angle, and when the detection light is to be irradiated from the detection light source, the MEMS mirror is electrified and is disposed at the second angle. That is, during nighttime running, the visible light is irradiated from the visible light source and the MEMS mirror is not electrified while the visible light is being irradiated. Therefore, during nighttime running, power of a battery mounted in the vehicle may be saved. Moreover, during daytime running, if the visible light source is turned off, the MEMS mirror is electrified and the detection light is continuously irradiated from the detection light source, detection accuracy of obstacles is improved.

In a headlamp device for a vehicle according to an eighth aspect of the present disclosure, in the headlamp device for a vehicle according to the seventh aspect, at a time at which visible light is irradiated from the visible light source, a light-shielding region of the MEMS mirror is electrified and is disposed at the second angle, reflection of the visible light toward the vehicle front side not being required at the light-shielding region.

According to the eighth aspect of the present disclosure, when the visible light is to be irradiated from the visible light source, the light-shielding region of the MEMS mirror, from which reflection toward the vehicle front side is not needed, is electrified and disposed at the second angle. Thus, the visible light is irradiated by the MEMS mirror only at a minimum region required for assuring the field of view at the vehicle front side. As a result, a problem such as dazzling of an oncoming vehicle or preceding vehicle with excessive visible light is suppressed.

In a headlamp device for a vehicle according to a ninth aspect of the present disclosure, in the headlamp device for a vehicle according to the seventh aspect or the eighth aspect, an illumination duration, during which detection light is irradiated from the detection light source, is shorter than a duration that is discernible by a human being.

According to the ninth aspect of the present disclosure, the detection light is irradiated from the detection light source for a duration shorter than the duration that is discernible by a human being. Therefore, during nighttime running, a human being's eyes will not notice that the visible light source is being extinguished. Thus, safety during nighttime running can be assured. Note that the duration that is discernible by a human being is around 10 ms (100 Hz).

In a headlamp device for a vehicle according to a tenth aspect of the present disclosure, in the headlamp device for a vehicle according to the seventh aspect, times at which detection light is irradiated from the detection light source include times of an autonomous driving mode.

According to the tenth aspect of the present disclosure, the visible light source is continuously turned off in the autonomous driving mode. Therefore, during nighttime running in the autonomous driving mode, power of a battery mounted in the vehicle may be saved.

According to the first aspect of the present disclosure, an increase in size of the headlamp unit may be suppressed and impairment of the external appearance of the vehicle may be suppressed.

According to the second aspect of the present disclosure, a problem such as dazzling of an oncoming vehicle, a preceding vehicle or the like may be suppressed.

According to the third aspect of the present disclosure, visible light that is to be irradiated onto the MEMS mirror may be efficiently condensed.

According to the fourth aspect of the present disclosure, space for arrangement of the light receiving element may be excellently assured.

According to the fifth aspect of the present disclosure, reflected light that is irradiated at the light receiving element may be efficiently condensed.

According to the sixth aspect of the present disclosure, respective positioning of the visible light source, the detection light source and the MEMS mirror may be facilitated.

According to the seventh aspect of the present disclosure, power of a battery mounted in the vehicle may be saved during nighttime running.

According to the eighth aspect of the present disclosure, a problem such as dazzling of an oncoming vehicle, a preceding vehicle or the like by excessive visible light may be suppressed.

According to the ninth aspect of the present disclosure, safety during nighttime running may be assured.

According to the tenth aspect of the present disclosure, power of a battery mounted in the vehicle may be saved during nighttime running in an autonomous driving mode.

BRIEF DESCRIPTION OF THE DRAWINGS

Exemplary embodiments of the present disclosure will be described in detail based on the following figures, wherein:

FIG. 1 is a front view showing a vehicle in which a headlamp device for a vehicle according to a present exemplary embodiment is installed.

FIG. 2 is a sectional diagram cut along line X-X in FIG. 1, showing structures of the headlamp device for a vehicle according to the present exemplary embodiment.

FIG. 3A is a descriptive diagram showing a state when a visible light source of the headlamp device for a vehicle according to the present exemplary embodiment is turned on;

FIG. 3B is a descriptive diagram showing a state when a detection light source of the headlamp device for a vehicle according to the present exemplary embodiment is turned on;

FIG. 6 is a sectional diagram, corresponding to FIG. 2, showing a second variant example of the headlamp device for a vehicle according to the present exemplary embodiment.

DETAILED DESCRIPTION

Figure 4A:
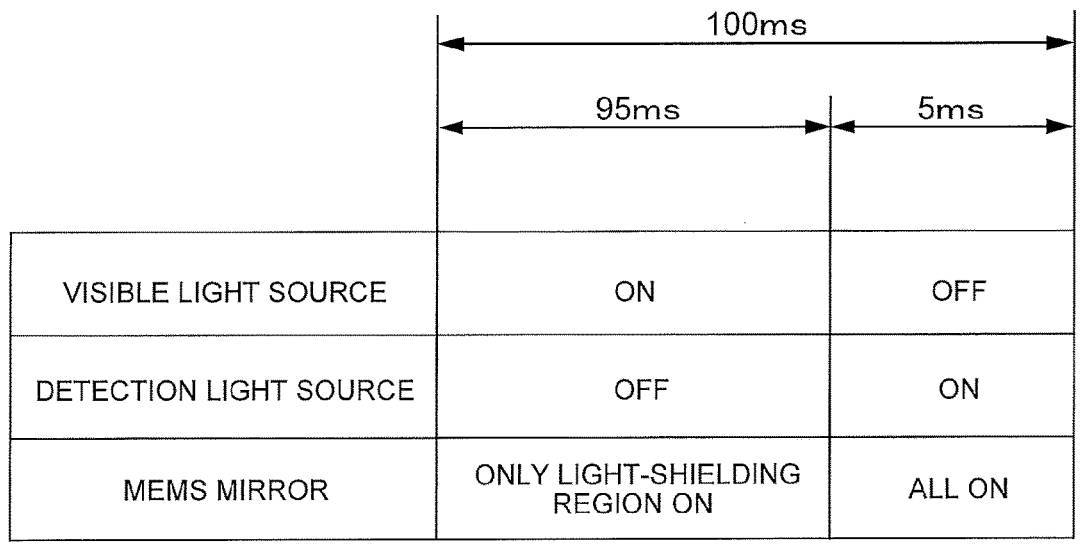
FIG. 4A is a table showing on and off durations of the visible light source, the detection light source and a MEMS mirror during nighttime running of the headlamp device for a vehicle according to the present exemplary embodiment.

Herebelow, exemplary embodiments relating to the present disclosure are described in detail in accordance with the drawings. For convenience of description, the arrow UP that is shown where appropriate in the drawings indicates a vehicle upper direction, the arrow FR indicates a vehicle front direction, and the arrow RH indicates a vehicle right direction. Thus, in the following descriptions, where the directions up and down, front and rear, and left and right are recited without being particularly specified, the same represent up and down in the vehicle up and down direction, front and rear in the vehicle front-rear direction, and left and right in the vehicle left and right direction (the vehicle width direction).

As shown in FIG. 1, a vehicle 12 is equipped with a pair of headlamp units 14 at left and right, for assuring a field of view at the front side of the vehicle 12. That is, a headlamp unit 14R is disposed at a right side end portion of a front end portion of the vehicle 12, and a headlamp unit 14L is disposed at a left side end portion of the front end portion of the vehicle 12. The headlamp units 14R and 14L are structured with left-right symmetry in the vehicle width direction.

Accordingly, in the present exemplary embodiment, the headlamp unit 14R at the right side is described and descriptions of the headlamp unit 14L at the left side are not given. The headlamp unit 14R at the right side includes a low beam unit 16 that constitutes a vehicle width direction outer side portion of the headlamp unit 14R and a high beam unit 18 that constitutes a vehicle width direction inner side portion.

The low beam unit 16 is configured to irradiate visible light onto a low beam light distribution area of a road surface to the front side of the vehicle 12. The high beam unit 18 irradiates visible light at a high beam light distribution area, which is diagonally to the upper-front side relative to the low beam light distribution area irradiated by the low beam unit 16.

The low beam unit 16 and the high beam unit 18 have substantially the same structures as one another. In the present exemplary embodiment, however, a configuration in which a headlamp device for a vehicle 10 is employed at the high beam unit 18 is taken as an example. Accordingly, the high beam unit 18 is described below.

As shown in FIG. 2, the high beam unit 18 includes a heat sink 20 that functions as a heat dissipation member that dissipates heat produced by a visible light source 30, which is described below, and the like. The heat sink 20 is fixed to a housing (not shown in the drawings) of the high beam unit 18. The heat sink 20 is formed of an aluminium alloy with high thermal conductivity in a block shape that, in a side sectional view seen in the vehicle width direction, forms a substantial "U" shape of which the front side is open. In other words, an upper end portion and a lower end portion of the heat sink 20 project further to the front side than a middle portion of the heat sink 20.

The lower end portion of the heat sink 20 is an under portion 22. An angled surface 22A is formed at the upper side of a front face of the under portion 22. In a side view seen in the vehicle width direction, the angled surface 22A is angled downward toward the front. The visible light source 30 is disposed at (fixed to) the angled surface 22A. The visible light source 30 has a plural number of high-intensity light sources such as light-emitting diodes (LEDs), halogen lamps, discharge lamps, semiconductor lasers (laser diodes (LD)) or the like. The visible light source 30 is electronically connected to a control unit (not shown in the drawings). Thus, the visible light source 30 is configured to be turned on and off by both switch operations by a driver and control from the control unit.

A concave reflection mirror 32 is disposed at a predetermined inclination angle to the front side of the under portion 22 of the heat sink 20. The concave reflection mirror 32 reflects visible light irradiated from the visible light source 30 diagonally toward the upper-rear side. The concave reflection mirror 32 is formed in a plate shape that is curved to protrude toward the front side. The rear face of the concave reflection mirror 32 serves as a reflection surface 33 with a concave surface shape. The concave reflection mirror 32 and the under portion 22 of the heat sink 20 are covered from the front side by a bumper cover 15 (see FIG. 1) that structures the front end portion of the vehicle 12.

The middle portion of the heat sink 20 is a middle portion 24. A MEMS (Micro Electro Mechanical Systems) mirror 50 is disposed at the middle portion 24. The visible light that has been reflected and condensed diagonally toward the upper-rear side by the reflection surface 33 of the concave reflection mirror 32 is irradiated at the MEMS mirror 50. The visible light irradiated onto the MEMS mirror 50 is reflected toward the front side. The MEMS mirror 50 is configured to also be capable of reflecting infrared light irradiated from a detection light source 40, which is described below. A specific configuration of the MEMS mirror 50 is described in detail below.

A lens retention portion 34 fabricated of resin is provided integrally at the upper side of the concave reflection mirror 32. The lens retention portion 34 retains a lens 36, through which the visible light reflected by the MEMS mirror 50 is transmitted. The lens retention portion 34 is formed in a substantial tube shape with an optical axis direction in the front-rear direction. A lower side rear end portion of the lens retention portion 34 is joined to the front face of an upper portion of the concave reflection mirror 32. The lens 36 is retained by the lens retention portion 34.

That is, a projecting portion 38 is integrally formed at a portion partway along the lens 36 in the optical axis direction. The projecting portion 38 projects in a diametric direction of the lens 36 along a circumferential direction (over the whole circumference) of the lens 36. The lens 36 is inserted into the lens retention portion 34 from the front side and fixed in a state in which the projecting portion 38 is abutted against a front end portion of the lens retention portion 34. Thus, the lens 36 is structured to be disposed at the front side of the MEMS mirror 50 with optical axes thereof matched up. In a side view seen in the vehicle width direction, a front face 36A of the lens 36 is formed in a curved surface shape that protrudes toward the front side.

An upper end portion of the heat sink 20 is an upper portion 26. A half-mirror 42 that serves as a turnback reflection mirror is disposed (fixed) at a predetermined inclination angle (facing diagonally downward to the rear side) at a front end lower portion of the upper portion 26. A recess portion 28 is formed in the upper portion 26 at a back side (the diagonal upper-front side) of the half-mirror 42. The detection light source 40 that irradiates infrared light, which serves as detection light, is disposed (fixed) in the recess portion 28. The detection light source 40 is disposed to be parallel with (at the same inclination angle as) the half-mirror 42.

The detection light source 40 is electronically connected to the control unit. That is, the detection light source 40 is configured to be turned on and off by control from the control unit. A light receiving element 44 is disposed at (fixed to) an upper portion of the middle portion 24 that is at the upper side relative to the MEMS mirror 50. The light receiving element 44 receives infrared light reflected by the half-mirror 42. The light receiving element 44 too is electronically connected to the control unit.

The MEMS mirror 50 includes a mirror main body portion 54 and a support portion 52 that supports the mirror main body portion 54. The support portion 52 is formed in a substantially cuboid shape and is fixed to the front face of the middle portion 24 of the heat sink 20. The mirror main body portion 54 is supported at a front face of the support portion 52. The mirror main body portion 54 is structured by numerous microscopic movable mirrors (not shown in the drawings) that are arrayed two-dimensionally. The numerous microscopic movable mirrors are formed on a semiconductor substrate by a semiconductor process.

The control unit is electronically connected to the mirror main body portion 54, forming a configuration in which the microscopic movable mirrors are driven by control from the control unit. To describe this in more detail, a state in which the microscopic movable mirrors (the mirror main body portion 54) are not being driven by control from the control unit (i.e., the microscopic movable mirrors are not electrified and angles thereof are not altered) is an off state of the MEMS mirror 50, in which each microscopic movable mirror (of the mirror main body portion 54) has a first angle. (In FIG. 3A, one of the microscopic movable mirrors disposed at the first angle is magnified, which is a microscopic movable mirror 55.)

When the microscopic movable mirrors (the mirror main body portion 54) have this first angle, visible light that has been irradiated from the visible light source 30 and reflected and condensed by the concave reflection mirror 32 is irradiated onto and reflected by the MEMS mirror 50 (the mirror main body portion 54), is transmitted through the lens 36 from rear to front, and is irradiated to the front side of the vehicle 12. Thus, the high beam light distribution area at the front side of the vehicle 12 is irradiated with the visible light.

In contrast, a state in which the microscopic movable mirrors (the mirror main body portion 54) are being driven by control from the control unit (i.e., the microscopic movable mirrors are electrified and angles thereof are altered) is an on state of the MEMS mirror 50, in which each microscopic movable mirror (of the mirror main body portion 54) has a second angle that is different from the first angle. (In FIG. 3B, one of the microscopic movable mirrors disposed at the second angle is magnified, which is the microscopic movable mirror 55.)

When the microscopic movable mirrors (the mirror main body portion 54) have this second angle, infrared light that has been irradiated from the detection light source 40 and transmitted through the half-mirror 42 is irradiated onto and reflected by the MEMS mirror 50 (the mirror main body portion 54), is transmitted through the lens 36 from rear to front, and is irradiated to the front side of the vehicle 12.

When infrared light that has been transmitted from rear to front through the lens 36 and irradiated to the front side of the vehicle 12 meets and is reflected (becoming reflected light) by an obstacle (such as a pedestrian; not shown in the drawings), the reflected light is transmitted through the lens 36 from front to rear, is irradiated onto the MEMS mirror 50 (the mirror main body portion 54), and is reflected by the MEMS mirror 50 (the mirror main body portion 54) toward the half-mirror 42.

The infrared light (reflected light) that has been reflected by the MEMS mirror 50 (the mirror main body portion 54) and irradiated toward the half-mirror 42 is reflected by the half-mirror 42 and irradiated at the light receiving element 44. That is, infrared light (reflected light) that has been irradiated from the detection light source 40 and reached and been reflected by an obstacle is detected by the light receiving element 44. Thus, a configuration is formed in which obstacles and the like disposed at the front side of the vehicle 12 can be detected by the control unit.

Now, operations of the headlamp device for a vehicle 10 according to the present exemplary embodiment with the structure described above are described.

As shown in FIG. 3A, during nighttime running of the vehicle 12 (see FIG. 1), the visible light source 30 is turned on by a switch operation by a driver. Thus, visible light V1 irradiated from the visible light source 30 is reflected and condensed by the reflection surface 33 of the concave reflection mirror 32 and is irradiated at the mirror main body portion 54 of the MEMS mirror 50. The mirror main body portion 54 of the MEMS mirror 50 (the numerous microscopic movable mirrors) is in the off state in which the microscopic movable mirrors are not electrified. Thus, the microscopic movable mirrors are disposed at the first angle.

Visible light V2 that is irradiated onto the mirror main body portion 54 of the MEMS mirror 50 is reflected by the mirror main body portion 54 of the MEMS mirror 50 and directed toward the front side, and is transmitted from rear to front of the lens 36. Hence, visible light V3 is irradiated at the high beam light distribution area to the front side of the vehicle 12.

Figure 4B:
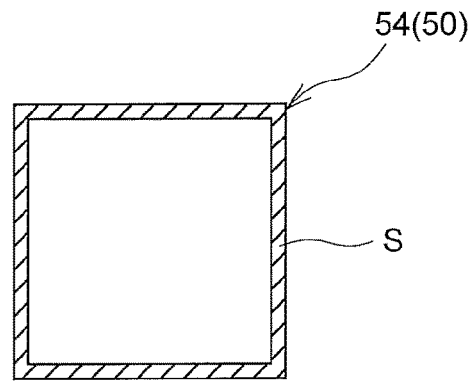
FIG. 4B is a schematic diagram showing a light-shielding region of the MEMS mirror of the headlamp device for a vehicle according to the present exemplary embodiment.

At this time, it is preferable if some of the numerous microscopic movable mirrors constituting the mirror main body portion 54 of the MEMS mirror 50 in a light-shielding region S are electrified by control from the control unit, as illustrated by the diagonal lines in FIG. 4B. (The light-shielding region S is a region that is not required for illumination of the visible light toward the front side of the vehicle and is, for example, a periphery edge region of the mirror main body portion 54.) Thus, the microscopic movable mirrors in the light-shielding region S are disposed at the second angle (or an alternative angle is acceptable provided it is different from the first angle).

Accordingly, the visible light is irradiated by the mirror main body portion 54 of the MEMS mirror 50 only at a minimum region required to assure a field of view at the front side of the vehicle 12. Consequently, a problem such as dazzling of an oncoming vehicle, a preceding vehicle or the like with excessive visible light may be suppressed.

During nighttime running of the vehicle 12, when it is to be detected whether or not there is an obstacle to the front side of the vehicle 12 (whether or not a pedestrian is present), the mirror main body portion 54 of the MEMS mirror 50 (the numerous microscopic movable mirrors) is electrified and put into the on state by control from the control unit. Thus, the mirror main body portion 54 is disposed at the second angle.

In addition, the visible light source 30 is turned off and the detection light source 40 is turned on by control from the control unit. Hence, as illustrated by the solid line in FIG. 3B, infrared light F1 irradiated from the detection light source 40 is transmitted through the half-mirror 42 and irradiated at the mirror main body portion 54 of the MEMS mirror 50.

At this time, because the mirror main body portion 54 is disposed at the second angle, the infrared light F1 irradiated onto the mirror main body portion 54 of the MEMS mirror 50 is reflected by the mirror main body portion 54 of the MEMS mirror 50 and directed to the front side, and is transmitted from rear to front of the lens 36. Thus, infrared light F2 is irradiated to the front side of the vehicle 12.

If the infrared light F2 that is irradiated to the front side of the vehicle 12 meets and is reflected by an obstacle (which may be a pedestrian), the infrared light becomes reflected light C1 and is incident on the front face 36A of the lens 36, as illustrated by the broken line in FIG. 3B. The reflected light C1 that is incident on the front face 36A of the lens 36 is transmitted through the lens 36 from front to rear, is irradiated onto the mirror main body portion 54 of the MEMS mirror 50 disposed at the second angle, and is reflected toward the half-mirror 42 by the mirror main body portion 54 of the MEMS mirror 50.

The reflected light C2 that is reflected toward the half-mirror 42 is reflected again by the half-mirror 42 and irradiated toward the light receiving element 44. Thus, infrared light that has been irradiated from the detection light source 40 and reached and been reflected by an obstacle (reflected light C3) is detected by the light receiving element 44. Therefore, an obstacle (which may be a pedestrian) disposed to the front side of the vehicle 12 can be detected by the control unit. When the light receiving element 44 receives the infrared light (the reflected light C3) or a predetermined duration has passed, the detection light source 40 is turned off and the visible light source 30 is turned on by control from the control unit.

In this exemplary embodiment, an illumination duration for which the infrared light is irradiated from the detection light source 40 (the duration for which the detection light source 40 is turned on and light is detected) is a momentary duration that is shorter than a duration that is discernible by a human being (around 10 ms (100 Hz)). To describe this more specifically, for example, as shown in FIG. 4A, a setting is made to detect for obstacles once each 100 ms, the duration for which the visible light source 30 is turned on is 95 ms, and the duration for which the detection light source 40 is turned on and the light is detected is 5 ms (200 Hz). Therefore, during nighttime running, a human being's eyes will not notice that the visible light source 30 is being extinguished. Thus, safety during nighttime running can be assured.

When the visible light is irradiated from the visible light source 30, the mirror main body portion 54 (the numerous microscopic movable mirrors) of the MEMS mirror 50 (apart from the light-shielding region S) is not electrified (is de-energized) and is disposed at the first angle. When the infrared light is irradiated from the detection light source 40, the mirror main body portion 54 is electrified and is disposed at the second angle.

That is, during nighttime running, the visible light is irradiated from the visible light source 30 and the mirror main body portion 54 of the MEMS mirror 50 is not electrified while the visible light is being irradiated. Therefore, during nighttime running, power of a battery mounted in the vehicle 12 may be saved.

As shown in FIG. 2, FIG. 3A and FIG. 3B, in a front view seen in the vehicle front-rear direction, the visible light source 30 and the detection light source 40 are disposed above and below the MEMS mirror 50, sandwiching the MEMS mirror 50. If, for example, the visible light source 30 and the detection light source 40 were both disposed at the upper side or the lower side of the MEMS mirror 50, there would be hardly any difference between the first angle and the second angle.

Hence, during nighttime running or the like, which is described below, when the detection light source 40 was turned on by control from the control unit and the infrared light was irradiated, if a driver mistakenly turned on the visible light source 30, at least some of the visible light would be directly reflected by the MEMS mirror 50, the visible light would leak to the front side of the vehicle 12, and there might be a problem such as dazzling of an oncoming vehicle or a preceding vehicle.

According to the present exemplary embodiment, however, because the visible light source 30 and the detection light source 40 are disposed above and below the MEMS mirror 50 to sandwich the MEMS mirror 50, the difference between the first angle and the second angle may be made relatively large. Therefore, if a driver mistakenly turns on the visible light source 30 when the detection light source 40 has been turned on by control from the control unit and the infrared light is being irradiated, the visible light is not directly reflected by the MEMS mirror 50 and none of the visible light leaks to the front side of the vehicle 12.

As a result, a problem such as dazzling of an oncoming vehicle or preceding vehicle may be suppressed. When a certain duration has passed after the driver turning on the visible light source 30, the switch operation is determined to be significant (i.e., nighttime driving) by the control unit, the detection light source 40 is turned off by control from the control unit, and the MEMS mirror 50 is disposed at the first angle. That is, the visible light is irradiated onto the high beam light distribution area to the front side of the vehicle 12.

In the headlamp device for a vehicle 10 relating to the present exemplary embodiment, the visible light source 30 and the detection light source 40 are provided to be arrayed vertically (above and below) in the headlamp unit 14 (the high beam unit 18), and the visible light or infrared light reflected by the MEMS mirror 50 is irradiated. Therefore, compared to a structure in which the visible light source 30 and detection light source 40 are provided to be arrayed horizontally (left and right) and the visible light and infrared light are irradiated directly, an increase in size of the headlamp unit 14 (the high beam unit 18) to the vehicle width direction inner side may be suppressed and impairment of the external appearance (design) of the vehicle 12 may be suppressed.

The visible light source 30, the detection light source 40, the MEMS mirror 50 and the light receiving element 44 are integrally retained by the single heat sink 20. Therefore, compared to a structure in which the visible light source 30, the detection light source 40, the MEMS mirror 50 and the light receiving element 44 are retained by respectively separate heat sinks 20, characteristics of installation of the visible light source 30, the detection light source 40, the MEMS mirror 50 and the light receiving element 44 into the high beam unit 18 are good and mispositioning of each may be suppressed. That is, respective positioning of the visible light source 30, the detection light source 40, the MEMS mirror 50 and the light receiving element 44 may be facilitated.

The visible light irradiated from the visible light source 30 is reflected and condensed by the concave reflection mirror 32 and irradiated onto the mirror main body portion 54 of the MEMS mirror 50. Therefore, the visible light irradiated at the mirror main body portion 54 of the MEMS mirror 50 may be condensed more efficiently than in a structure in which the concave reflection mirror 32 is not provided.

Reflected light that is reflected by an obstacle, incident through the front face 36A of the lens 36, transmitted through the lens 36 from front to rear, and irradiated onto the mirror main body portion 54 of the MEMS mirror 50 is reflected by the mirror main body portion 54 of the MEMS mirror 50, and is then reflected by the half-mirror 42 and irradiated onto the light receiving element 44. Therefore, a degree of freedom of a disposition location of the light receiving element 44 may be greater than in a structure in which the half-mirror 42 is not provided, and space for arranging the light receiving element 44 at the heat sink 20 may be excellently assured.

Figure 5:
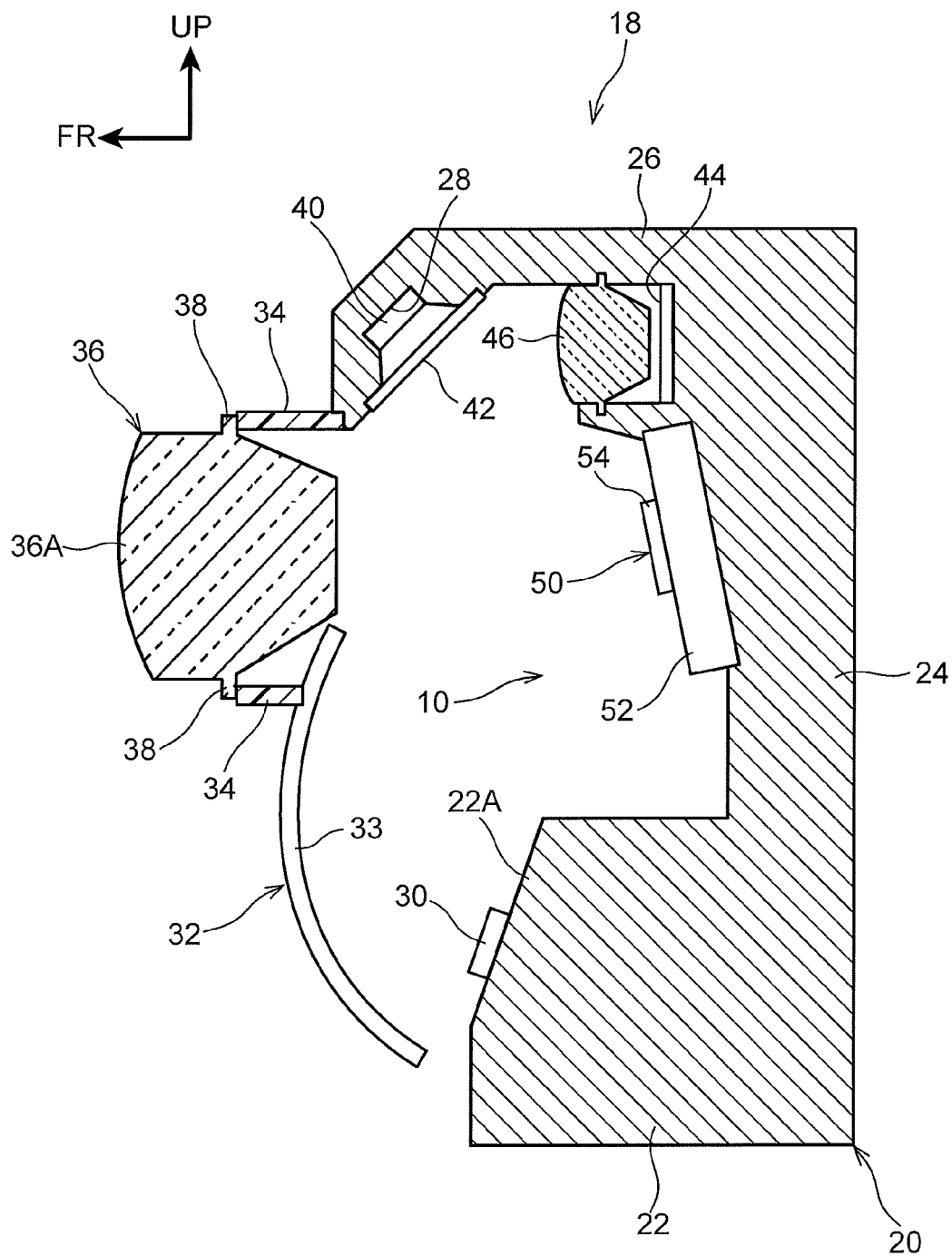
FIG. 5 is a sectional diagram, corresponding to FIG. 2, showing a first variant example of the headlamp device for a vehicle according to the present exemplary embodiment.

As shown in FIG. 5 (a first variant example), a condensing lens 46 (a reflected light control lens) may be disposed between the half-mirror 42 and the light receiving element 44. The condensing lens 46 condenses reflected light (infrared light) that is irradiated at the light receiving element 44. Accordingly, compared to a structure in which the condensing lens 46 is not disposed between the half-mirror 42 and the light receiving element 44, reflected light (infrared light) that is irradiated at the light receiving element 44 may be condensed efficiently and detection performance of obstacles (pedestrians) may be improved.

A turnback reflection mirror is not limited to the half-mirror 42. For example, as shown in FIG. 6, an ordinary mirror 48 may be used. In this case, it is sufficient that the detection light source 40 be disposed at, for example, the lower side of the mirror 48 (a second variant example). Although not shown in the drawings, in this case a structure is possible in which the detection light source 40 is disposed at a central portion of the mirror 48.

During daytime running of the vehicle 12, because there is no need to turn on the visible light source 30, the mirror main body portion 54 of the MEMS mirror 50 may be continuously disposed at the second angle by control from the control unit, and infrared light may be continuously irradiated to the front side of the vehicle 12 by the detection light source 40. Accordingly, during daytime running of the vehicle 12, detection performance of obstacles (pedestrians) may be improved.

If the vehicle 12 is an autonomous driving vehicle, then when the vehicle 12 is in an autonomous driving mode in which no driver is driving, there is no need to turn on the visible light source 30 during nighttime running, as well as during daytime running. That is, during the autonomous driving mode, the mirror main body portion 54 of the MEMS mirror 50 is continuously disposed at the second angle by control from the control unit, and infrared light alone is continuously irradiated by the detection light source 40 to the front side of the vehicle 12. As a result, power of a battery mounted in the autonomous driving vehicle may be saved.

In these situations, the mirror main body portion 54 of the MEMS mirror 50 (the numerous microscopic movable mirrors) is continuously disposed at the second angle. Thus, the mirror main body portion 54 is not altered between the first angle and the second angle frequently (for example, once each 100 ms) as in the nighttime running of the vehicle 12 described above. Therefore, a deterioration in endurance (the lifetime) of the MEMS mirror 50 (i.e., the mirror main body portion 54) may be suppressed.

Hereabove, the headlamp device for a vehicle 10 according to the present exemplary embodiment is described by reference to the drawings. However, the headlamp device for a vehicle 10 according to the present exemplary embodiment is not limited to the structures shown in the drawings; suitable design modifications are possible within a scope not departing from the gist of the present disclosure. For example, the detected light is not limited to infrared light.

Further, the shape of the heat sink 20 is not limited to the shape shown in the drawings. In the mode illustrated in FIG. 6 in which the mirror 48 is disposed at the upper side of the detection light source 40, the condensing lens 46 illustrated in FIG. 5 may also be provided. A configuration is also possible in which the half-mirror 42 and mirror 48 are not provided and, for example, the light receiving element 44 is provided with the detection light source 40, arrayed above and below one another, at a front end lower portion of the upper portion 26 of the heat sink 20.

That is, rather than the reflected light reflected by the mirror main body portion 54 of the MEMS mirror 50 being reflected again at the half-mirror 42, the mirror 48 or the like, configurations are possible in which the reflected light is detected by the light receiving element 44 directly. Moreover, the light receiving element 44 need not be integrally retained at the heat sink 20. Furthermore, the headlamp device for a vehicle 10 according to the present exemplary embodiment is not limited to configurations in which the headlamp device for a vehicle 10 is applied to the high beam unit 18. Configurations are possible in which the headlamp device for a vehicle 10 is applied to the low beam unit 16.

What is claimed is:

1. A headlamp device for a vehicle, comprising:
   a visible light source that irradiates visible light to provide a field of view at a vehicle front side;
   a detection light source that irradiates detection light that detects obstacles;
   a MEMS mirror changeable between a first angle and a second angle that is different from the first angle, the MEMS mirror at the first angle reflecting visible light, irradiated from the visible light source, toward the vehicle front side, and the MEMS mirror at the second angle reflecting detection light, irradiated from the detection light source, toward the vehicle front side; and
   a light receiving element that receives reflected light that has reached and been reflected by an obstacle.

2. The headlamp device for a vehicle according to claim 1, wherein, in a front view seen in a vehicle front-rear direction, the visible light source and the detection light source are arranged above and below the MEMS mirror to sandwich the MEMS mirror.

3. The headlamp device for a vehicle according to claim 1, further comprising a concave reflection mirror that reflects visible light irradiated by the visible light source onto the MEMS mirror.

4. The headlamp device for a vehicle according to claim 1, further comprising a turnback reflection mirror that reflects reflected light that has been irradiated onto and reflected by the MEMS mirror, the turnback reflection mirror reflecting the reflected light onto the light receiving element.

5. The headlamp device for a vehicle according to claim 4, further comprising a condensing lens disposed between the turnback reflection mirror and the light receiving element, the condensing lens condensing the reflected light that is reflected onto the light receiving element.

6. The headlamp device for a vehicle according to claim 1, wherein the visible light source, the detection light source and the MEMS mirror are retained by a single heat sink.

7. The headlamp device for a vehicle according to claim 1, wherein:

at a time at which visible light is irradiated from the visible light source, the MEMS mirror is not electrified and is disposed at the first angle; and at a time at which detection light is irradiated from the detection light source, the MEMS mirror is electrified and is disposed at the second angle.

8. The headlamp device for a vehicle according to claim 7, wherein, at a time at which visible light is irradiated from the visible light source, a light-shielding region of the MEMS mirror is electrified and is disposed at the second angle, and reflection of the visible light toward the vehicle front side is not required at the light-shielding region.

9. The headlamp device for a vehicle according to claim 7, wherein an irradiation duration, during which detection light is irradiated from the detection light source, is shorter than a duration that is discernible by a human being.

10. The headlamp device for a vehicle according to claim 7, wherein times at which detection light is irradiated from the detection light source include times of an autonomous driving mode.

\* \* \* \* \*